United States Patent
Cowie et al.

(10) Patent No.: US 7,346,781 B2
(45) Date of Patent: Mar. 18, 2008

(54) INITIATING EXECUTION OF A COMPUTER PROGRAM FROM AN ENCRYPTED VERSION OF A COMPUTER PROGRAM

(75) Inventors: Neil Andrew Cowie, Aylesbury (GB); Igor Garrievich Muttik, Berkhamsted (GB); Daniel Joseph Wolff, Aylesbury (GB)

(73) Assignee: McAfee, Inc., Santa Clara, CA (US)

( * ) Notice: Subject to any disclaimer, the term of this patent is extended or adjusted under 35 U.S.C. 154(b) by 1288 days.

(21) Appl. No.: 10/003,322

(22) Filed: Dec. 6, 2001

(65) Prior Publication Data

US 2003/0110387 A1  Jun. 12, 2003

(51) Int. Cl.
*G06F 21/00* (2006.01)
*G06F 21/22* (2006.01)
*G06F 21/24* (2006.01)

(52) U.S. Cl. .................. 713/189; 713/191; 713/1; 717/168; 726/24

(58) Field of Classification Search ................ 713/189; 726/22–26
See application file for complete search history.

(56) References Cited

U.S. PATENT DOCUMENTS 5,724,425 A * 3/1998 Chang et al. ................. 705/52
5,826,013 A * 10/1998 Nachenberg .................. 726/22
6,006,328 A * 12/1999 Drake ........................... 726/23
6,763,466 B1 * 7/2004 Glover ........................ 726/24
6,895,506 B1 * 5/2005 Abu-Husein ................ 713/193
2001/0037450 A1* 11/2001 Metlitski et al. ............ 713/152
2004/0236960 A1* 11/2004 Zimmer et al. ............. 713/200
2006/0168014 A1* 7/2006 Wang .......................... 709/206
2006/0288416 A1* 12/2006 Costea et al. ................ 726/24
2007/0174916 A1* 7/2007 Ching ......................... 726/24

* cited by examiner

*Primary Examiner*—Syed A. Zia
(74) *Attorney, Agent, or Firm*—Zilka-Kotab, PC; Christopher J. Hamaty (57) ABSTRACT

When a user commands execution of a computer program to commence, a loader program 2 is first started. This loader program 2 reads an encrypted version of the computer program 6 and decrypts it using a public key. This generates an executable version of the computer program 9 which is written directly to the computer memory 8. When the loader program 2 has decrypted the whole of the computer program 9 it starts execution of the computer program 9 it has written into the computer memory 8 and terminates itself or is terminated by the computer program it started. The computer program 9 written into the computer memory 8 will be written into its own memory space and will have its own execution thread. The encryption used may be public key/private key encryption.

27 Claims, 4 Drawing Sheets

INITIATING EXECUTION OF A COMPUTER PROGRAM FROM AN ENCRYPTED VERSION OF A COMPUTER PROGRAM

BACKGROUND OF THE INVENTION

1. Field of the Invention

This invention relates to the field of data processing systems. More particularly, this invention relates to the initiation of execution of a computer program using a mechanism that seeks to protect the computer program from malicious alteration.

2. Description of the Prior Art

It is known that malicious persons can generate computer programs (malware), that alter an existing other computer program so as to embed themselves within it or to subvert its actions. Computer virus scanners are provided to search for such malicious code within computer files and to repair infected computer files.

A particular difficulty arises in the case of computer viruses that seek to insert themselves within and alter the virus scanner itself. The virus scanner code typically has high level access to all the functions of a computer and so, if it is infected, then it can do considerable damage. Furthermore, if the virus scanner is infected, then it may not be capable of itself detecting or repairing that infection as a repair would be seeking to alter a file that was already open in a manner that would be prevented by the operating system.

Mechanisms that can resist the infection of computer programs with malicious code or the alteration of computer programs are strongly advantageous.

It is known to compress computer files using various compression algorithms, such as those associated with ZIP files. ZIP files may be made self-extracting such that when they are executed they decompress one or more computer files embedded within themselves and write these computer files into a temporary directory of the computer upon which they are executing, the decompressed files then being recoverable from the temporary directory.

It is also known to provide computer programs in a packed form. Upon execution such packed computer programs are loaded into memory and then act to decompress themselves within their memory space.

Both the ZIP file form and the packed executable file form are compression techniques that do not provide significant protection against malicious alteration of the files concerned.

SUMMARY OF THE INVENTION

Viewed from one aspect the present invention provides a computer program product for controlling a computer to execute a computer program within a computer memory, said computer program product comprising:
  (a) a loader program; and
  (b) an encrypted version of said computer program; wherein said loader program is operable to:
  (i) read said encrypted version of said computer program stored in a program store;
  (ii) decrypt said encrypted version of said computer program to form said computer program in an executable form;
  (iii) load said computer program directly into said computer memory; and
  (iv) trigger execution of said computer program as loaded into said computer memory by said loader program.

The invention recongnises that the computer program you wish to executed need not be stored in its executable form and could instead be stored in an encrypted form. Encrypting the computer file in its stored form makes it difficult for an unauthorised person to make alterations to that computer program. Instead of executing the computer program directly, the present technique instead starts by executing a loader program which reads the encrypted form of the computer program, decrypts the computer program, writes the computer program directly into the computer memory for execution and then triggers the start of the execution of that computer program. This technique makes it difficult to alter the computer program in a manner in which it will correctly decrypt. A person may seek to interfere with the loader program, but this will have the function of either stopping the loader program decrypting the computer program and may allow the computer program in its unaltered form the possibility of repairing the loader program.

It will be appreciated that the form of encryption used could be any of a wide variety of different encryption techniques. However, the invention is particularly well suited for use in systems in which the encrypted version of the computer file is encrypted with a private encryption key and the loader program is operable to decrypt the encrypted version of the computer program with a corresponding public key. Since the private key is unknown to malicious persons, they are not able to generate alternative versions of the encrypted version of the computer program that will be properly decrypted by the loader program.

The ability to separate the loader program from the encrypted version of the computer program in a manner that assists their independence is provided in preferred embodiments in which the loaded program and the encrypted version of the computer program are stored as separate computer files within a computer file store, such as upon the hard disk drive of a computer system.

The re-usability of the loader program across a plurality of separate computer programs is assisted in embodiments in which the loader program is associated with initialisation data specific to a particular associated computer program, such as a storage location of the encrypted version of that computer program (e.g. a file name), a key to be used in decrypting that particular computer program and parameters specifying how the computer program should be loaded and started.

Whilst, the loading and decryption technique of the present invention could be used to advantage with a variety of different types of computer programs is particularly well suited to protecting malware scanning computer programs. Such malware scanning computer programs are often a target for malicious alteration and such malicious alteration can have particularly damaging consequences due to the high level file access privileges normally associated with malware scanning computer programs.

A particular advantage associated with using such techniques with malware scanning computer programs is that the malware scanning computer program can be configured to scan the loader program when it has started to check whether the loader program has itself been infected. As the malware scanning program has been decrypted as a separate entity to the loader program it is significantly easier for the malware scanner to repair (or replace) the loader program.

It will be appreciated that a malware scanner can scan for a wide variety of different types of malware, not necessarily restricted to computer viruses but also including, for example, worms, Trojans, banned computer files, banned words and banned images.

It is convenient and reduces the consumption of system resources if the loaded program terminates itself once it has triggered the start of execution of the computer program in executable form. Alternatively, the computer that has just been decrypted and loaded may terminate the loader program.

The independence of the computer program and the loader program such that malicious alteration of the loader program is less likely to cause problems to the computer program is enhanced in embodiments in which the computer program is loaded into its own memory space separate from the memory space used by the loader program and the computer program is loaded into its own execution stream that is separate from that of the loader program.

Other aspects of the invention also provide a method for executing a computer program and an apparatus for executing a computer program in accordance with the above described techniques.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
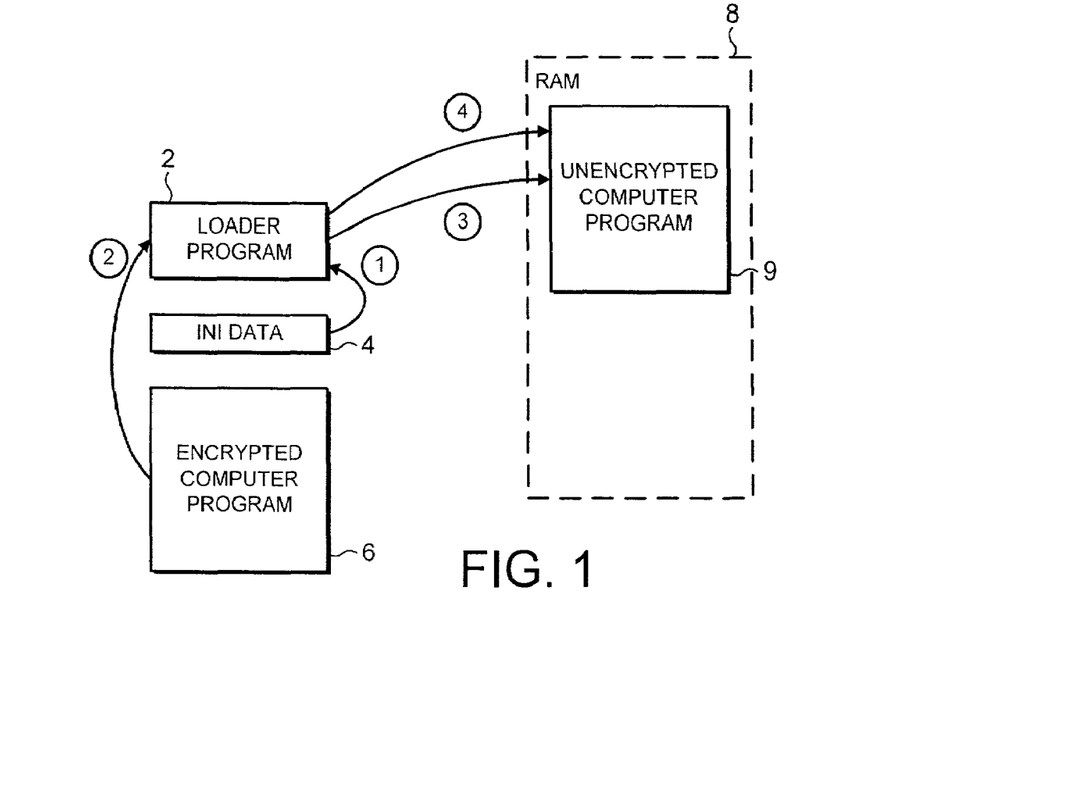
FIG. 1 schematically illustrates the action of a loader program in decrypting an encrypted version of the computer program and writing the unencrypted computer program to memory.

FIG. 1 illustrates a loader program 2 with its associated initialisation data 4 and encrypted version of a computer program 6. In operation, a user commands the loader program 2 (typically an EXE program) to start execution. The loader program 2 then reads the initialisation data 4 as its first step. Using this initialisation data 4, the loader program 2 locates the encrypted version of the computer program 6 and the public key that may be used to decrypt that encrypted version of the computer program 6. The loader program 2 then reads the encrypted version of the computer program 6 from its storage location and decrypts it using the public key. The loader program 2 writes the unencrypted computer program 9 in its executable form directly into the computer program memory 8. The computer program 9 is written into its own memory space and will be initialised using its own execution stream (task or thread). When the loader program 2 has finished decrypting the computer program 9 and writing it into the computer memory 8, it starts execution of the computer program 9 using parameters specified within the initialisation data 4.

It will be appreciated that whilst this example has been explained using the public key/private key encryption techniques, other encryption techniques may be utilised. A simple layered password technique may be used in which one password gives read only access and another password gives read and write access. Another alternative might be checksumming techniques whereby the loader program calculates a checksum from the version of the computer program that is stored and only writes the computer program into the memory 8 if the checksum matches.

Figure 2:
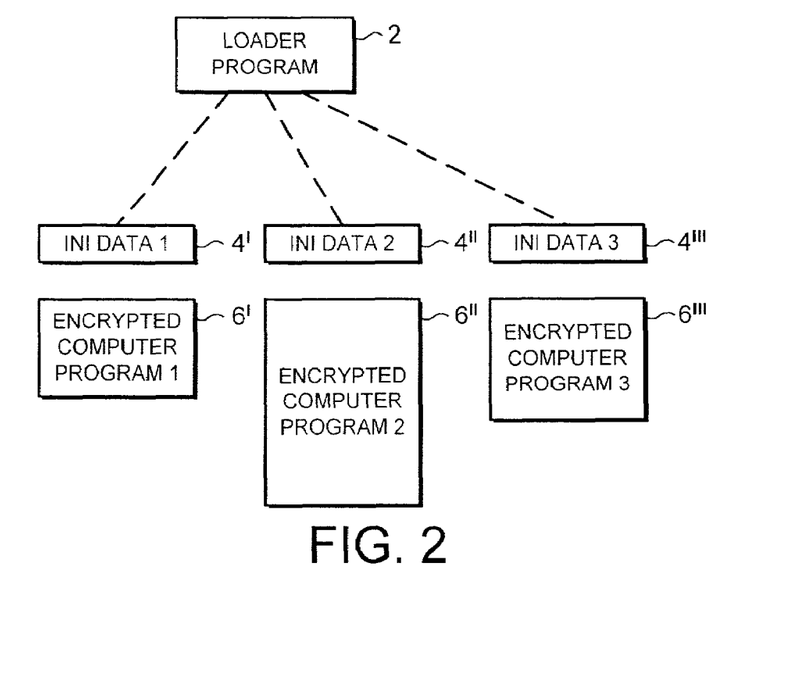
FIG. 2 illustrates how a single loader program can be associated with more than one encrypted computer program.

FIG. 2 illustrates an embodiment in which a single common loader program 2 may be associated with multiple initialisation data files $4^I$, $4^{II}$, $4^{III}$ and encrypted computer program files $6^I$, $6^{II}$, $6^{III}$. It is also possible for separate loader programs 2 to be provided for each initialisation file and encrypted computer file combination.

Figure 3:
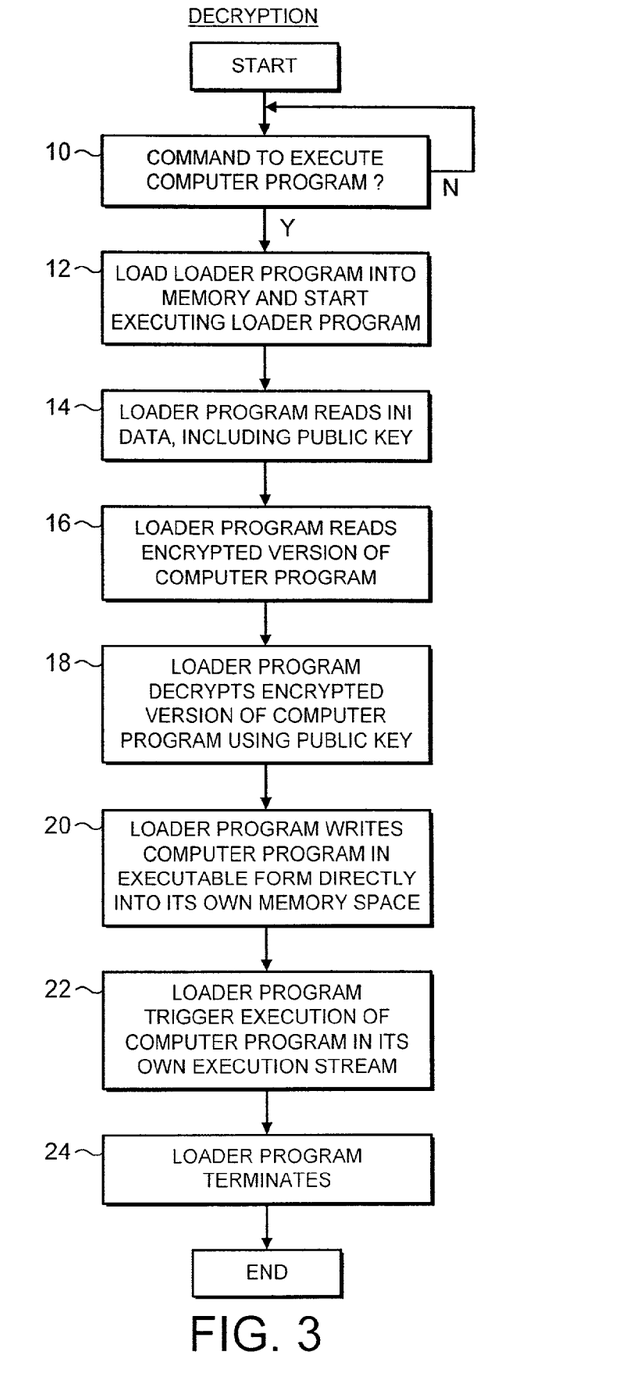
FIG. 3 is a flow diagram illustrating the loader program being used to decrypt a computer program and initiate its execution.

FIG. 3 is a flow diagram illustrating the starting of execution of a computer program. At step 10 the system waits for a user command to start executing a particular computer program. When such a command is received, step 12 serves to load the associated loader program for the instructed computer program into memory and to start executing that loader program.

At step 14 the loader program reads its associated initialisation data including the public key it will need to decrypt the encrypted version of the computer file and the location of the encrypted version of the computer file.

At step 16 the loader program reads the encrypted version of the computer program from its storage location, such as from a particular file on the hard disk drive or a secure encrypted storage area within a system.

At step 18 the loader program decrypts the encrypted version of the computer program using the public key read from the initialisation data.

At step 20 the loader program writes the computer program in executable form directly into its own memory space within the computer memory 8. This memory space can have been set up using parameters read from the initialisation data.

At step 22 the loader program triggers the commencement of execution of the computer program in executable form within its own execution stream (e.g. as its own task or thread).

Finally, at step 24 the loader program terminates its own execution and clears itself from the memory and the system. Alternatively, the computer program which has been decrypted, loaded and triggered may serve to terminate the loader program.

Figure 4:
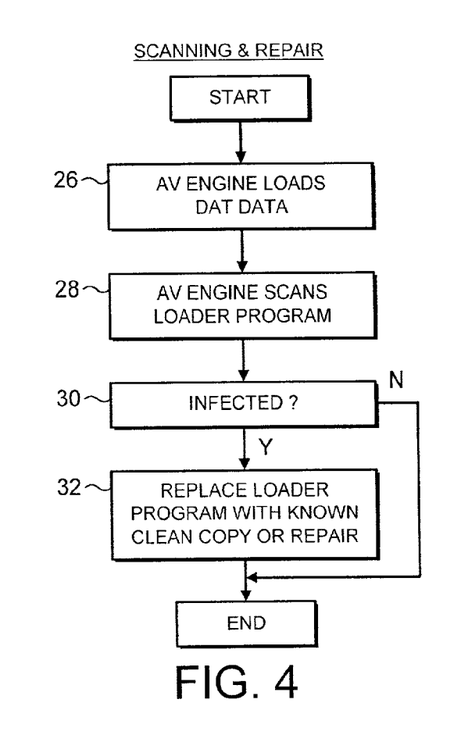
FIG. 4 is a flow diagram illustrating a malware scanning computer program that serves to repair its loader program.

FIG. 4 is a flow diagram schematically illustrating how, if the computer program being executed is a malware scanning computer program, then this can be used to scan and repair the loader program. At step 26 the malware scanning computer program has started executing (subsequent to a corresponding step 22 from FIG. 3) and serves to load its required malware definition data. At step 26 the malware scanning computer program automatically, and as its first task, conducts a malware scan upon its associated loader program. At step 30 a test is made as to whether or not the loader program is infected with malware. If the loader program is not infected, then processing regarding this self-checking action is terminated. If the loader program is infected, then step 32 will either replace the loader program with a known clean copy or repair the loader program. Thus, the malware scanner can be made self-repairing in a way that resists malicious tampering.

Figure 5:
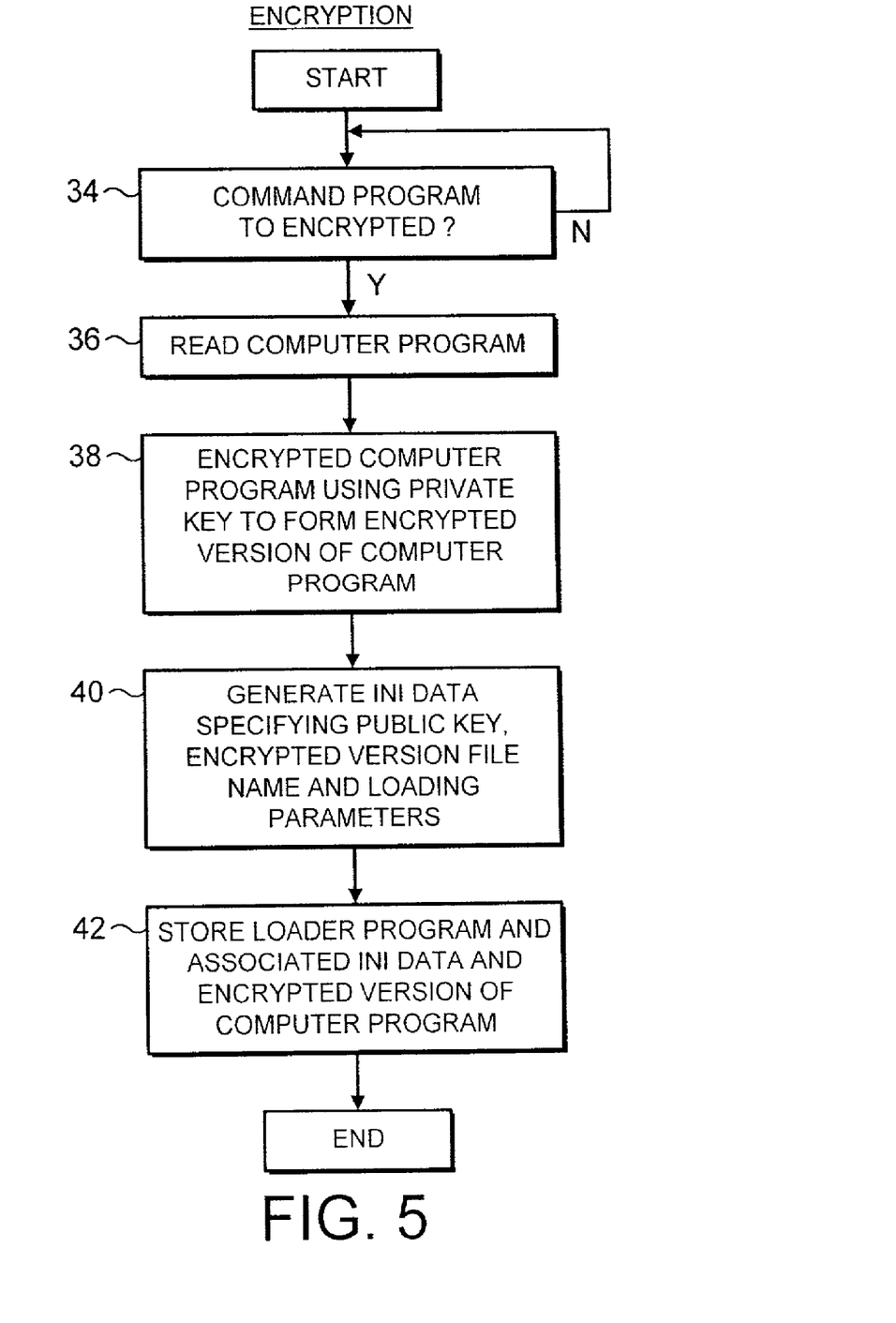
FIG. 5 is a flow diagram illustrating generation of an encrypted version of a computer program and its associated data for use by a loader program.

FIG. 5 is a flow diagram illustrating the creation of encrypted versions of a computer program. Such encrypted versions of a computer program would typically be generated by the provider of the computer program concerned.

At step 34, the system waits until a computer program to be encrypted is found. At step 36 the computer program to be encrypted is read in its executable form. At step 38 the computer program in its executable form is encrypted using a private key to form an encrypted version of that computer program. Step 40 then generates associated initialisation data that will be used by a loader program. The initialisation data includes a public key which can reverse the encryption applied at step 38 by the private key, an encrypted version file name enabling the loader program to properly identify the encrypted version of the computer program and loading parameters, such as the memory space requirements of the computer program in executable form, the execution start address of the computer program in executable form and other execution parameters.

At step 42 the loader program, the initialisation data and the encrypted version of the computer program are stored. These may be stored together or in separate locations. As an example, the loader program may be a common program that is unaltered between different computer programs to be protected and accordingly need not be separately stored on each occasion that an encrypted version of the computer program is made. The encrypted versions of the computer program may be stored separately within a high security data storage area.

Figure 6:
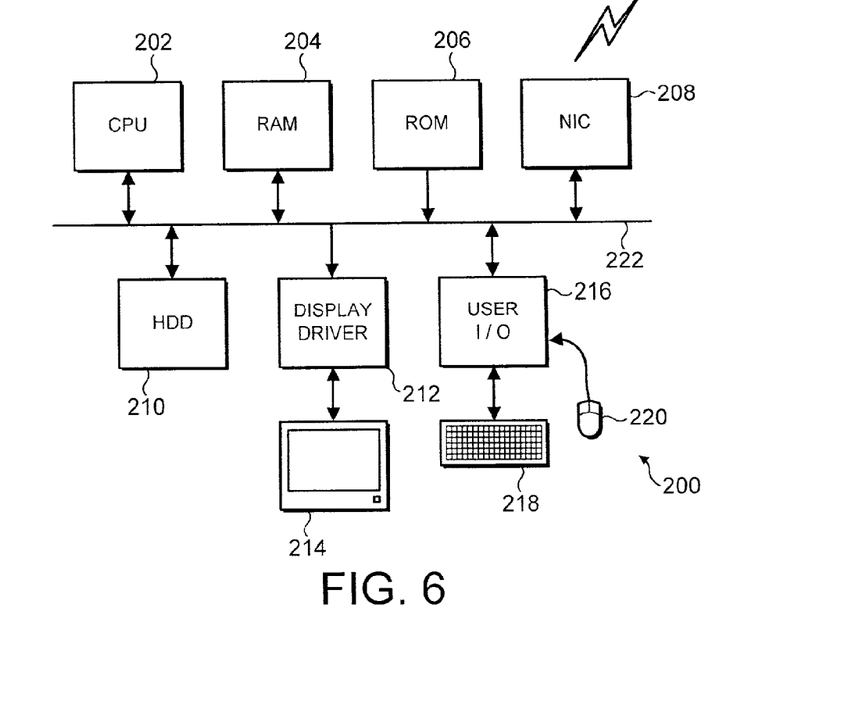
FIG. 6 schematically illustrates the architecture of a general purpose computer that may be used to implement the above described techniques.

FIG. 6 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 6 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product embodied on a tangible computer readable medium for controlling a computer to execute a computer program within said computer memory, said computer program product comprising:

(a) a loader program: and
(b) an encrypted version of said computer program; wherein said loader program is operable to:
  (i) read said encrypted version of said computer program stored in a program store;
  (ii) decrypt said encrypted version of said computer program to form said computer program in an executable form;
  (iii) load said computer program directly into said computer memory; and
  (iv) trigger execution of said computer program as loaded into said computer memory by said loader program;
wherein said computer program that is decrypted, loaded, and executed includes a malware scanning computer program:
wherein said malware scanning computer program is operable such that once executed, said malware scanning computer program scans said loader program for malware;
wherein, if said loader program is detected as being infected with said malware, then said malware scanning computer program is operable to repair said loader program or replace said loader program with a clean copy of said loader program;
wherein said malware scanning computer program is operable to scan for said malware including one or more of a computer virus, a worm, a Trojan, a banned computer file, a banned word and a banned image.

2. A computer program product as claimed in claim 1, wherein said encrypted version of said computer program is encrypted with a private encryption key and said loader program is operable to decrypt said encrypted version of said computer program with a corresponding public key.

3. A computer program product as claimed in claim 1, wherein said encrypted Version of said computer program and said loader program are stored as separate computer files within a computer file store.

4. A computer program product as claimed in claim 1, wherein said loader program is associated with initialisation data specifying one or more of:
  a storage location of said encrypted version of said computer program;
  a key to be used in decrypting said encrypted version of said computer program; and
  parameters specifying how said computer program should be loaded into said computer memory for execution.

5. A computer program product as claimed in claim 1, wherein said loader program is operable to terminate after triggering execution of said computer program.

6. A computer program product as claimed in claim 1, wherein said computer program is operable to terminate said loader program when said computer program is triggered to execute by said loader program.

7. A computer program product as claimed in claim 1, wherein said loader program is operable to load said computer program into a memory space within said computer memory separate from a memory space used by said loader program.

8. A computer program product as claimed in claim 1, wherein said loader program is operable to load said computer program into an execution stream separate from an execution stream used by said loader program.

9. A method of executing of a computer program embodied on a tangible computer readable medium, within a computer memory, said method comprising tile steps of:

(a) executing a loader program, said loader program operating to:
  (i) read an encrypted version of said computer program stored in a program store;
  (ii.) decrypt said encrypted version of said computer program to form said computer program in an executable form;
  (iii) load said computer program directly into said computer memory; and
  (iv) trigger execution of said computer program; and
(b) executing said computer program, as loaded into said computer memory by said loader program;
  wherein said computer program that is decrypted, loaded, and executed includes a malware scanning computer program;
  wherein said malware scanning computer program is operable such that once executed, said malware scanning computer program scans said loader program for malware;
  wherein, if said loader program is detected as being infected with said malware, then said malware scanning computer program is operable to repair said loader program or replace said loader program with a dean copy of said loader program;
  wherein said malware scanning computer program is operable to scan for said malware including one or more of a computer virus, a worm, a Trojan, a banned computer file, a banned word and a banned image.

10. A method as claimed in claim 9, wherein said encrypted version of said computer program is encrypted with a private encryption key and said loader program decrypts said encrypted version of said computer program with a corresponding public key.

11. A method as claimed in claim 9, wherein said encrypted version of said computer program and said loader program are stored as separate computer files within a computer file store.

12. A method as claimed in claim 9, wherein said loader program is associated with initialisation data specifying one or more of:
  a storage location of said encrypted version of said computer program;
  a key to be used in decrypting said encrypted version of said computer program; and
  parameters specifying how said computer program should be loaded into said computer memory for execution.

13. A method as claimed in claim 9, wherein said loader program tenninates after triggering execution of said computer programs.

14. A method as claimed in claim 9, wherein said computer program terminates said loader program when said computer program is triggered to execute by said loader program.

15. A method as claimed in claim 9, wherein said loader program loads said computer program into a memory space within said computer memory separate from a memory space used by said loader program.

16. A method as claimed in claim 9, wherein said loader program loads said computer program into an execution stream separate from an execution stream used by said loader program.

17. Apparatus for executing a computer program embodied on a tangible computer readable medium, within a computer memory, said apparatus comprising:
  (a) loader program logic; and
  (b) a program store operable to store an encrypted version of said computer program;
  wherein said loader program logic is operable to:
    (i) read said encrypted version of said computer program stored in said program store;
    (ii) decrypt said encrypted version of said computer program to form said computer program in an executable form;
    (iii) load said computer program directly into said computer memory; and
    (iv) trigger execution of said computer program as loaded into said computer memory by said loader program;
  wherein said computer program that is decrypted, loaded, and executed includes a malware scanning computer program;
  wherein said malware scanning computer program is operable such that once executed, said malware scanning computer program scans said loader program for malware;
  wherein if said loader program is detected as belong infected with said malware, then said malware scanning computer program is operable to repair said loader program or replace said loader program with a clean copy of said loader program;
  wherein said malware scanning computer program is operable to scan for said malware including one or more of a computer virus, a worm, a Trojan, a banned computer file, a banned word and a brained image.

18. Apparatus as claimed in claim 17, wherein said encrypted version of said computer program is encrypted with a private encryption key and said loader program logic is operable to decrypt said encrypted version of said computer program with a corresponding public key.

19. Apparatus as claimed in claim 17, wherein said encrypted version of said computer program and said loader program are stored as separate computer files within a computer file store.

20. Apparatus as claimed in claim 17, wherein said loader program logic is associated with initialisation data specifying one or more of:
  a storage location of said encrypted version of said computer program;
  a key to be used in decrypting said encrypted version of said computer program; and
  parameters specifying how said computer program should be loaded into said computer memory for execution.

21. Apparatus as claimed in claim 17, wherein said loader program logic is operable to terminate after triggering execution of said computer programs.

22. Apparatus as claimed in claim 17, wherein said computer program logic is operable to tenninate said loader program when said computer program is triggered to execute by said loader program.

23. Apparatus as claimed in claim 17, wherein said loader program logic is operable to load said computer program into a memory space within said computer memory separate from a memory space used by said loader program logic.

24. Apparatus as claimed in claim 17, wherein said loader program logic is operable to load said computer program into an execution stream separate from an execution stream used by said loader program logic.

25. A computer program product as claimed in claim 1, wherein, as a first task, said malware scanning computer program scans said loader program for said malware.

26. A computer program product as claimed in claim 1, wherein, if said loader program is detected as being infected with said malware, ten said malware scanning computer program is operable to replace said loader program with a clean copy of said loader program.

27. A computer program product as claimed in claim 1, wherein, if said loader program is detected as being infected with said malware, ten said malware scanning computer program is operable to repair said loader program.

* * * * *

UNITED STATES PATENT AND TRADEMARK OFFICE
CERTIFICATE OF CORRECTION

PATENT NO. : 7,346,781 B2
APPLICATION NO. : 10/003322
DATED : March 18, 2008
INVENTOR(S) : Cowie et al.

It is certified that error appears in the above-identified patent and that said Letters Patent is hereby corrected as shown below:

Col. 6, line 1, replace "program:" with -- program; --;
Col. 6, line 16, replace "program:" with -- program; --;
Col. 6, line 37, replace "Version" with -- version --;
Col. 6, line 67, replace "tile" with -- the --;
Col. 7, line 24, replace "dean" with -- clean --;
Col. 7, line 49, replace "tenninates" with -- terminates --;
Col. 8, line 21, replace "wherein" with -- wherein, --;
Col. 8, line 21, replace "belong" with -- being --:
Col. 8, line 29, replace "brained" with -- banned --;
Col. 8, line 52, replace "tenninate" with -- terminate --;
Col. 9, line 1, replace "ten" with -- then --;
Col. 10, line 1, replace "ten" with -- then --.

Signed and Sealed this

Twelfth Day of October, 2010

David J. Kappos
*Director of the United States Patent and Trademark Office*